United States Patent [19]
Yamamoto

[11] Patent Number: 6,078,293
[45] Date of Patent: Jun. 20, 2000

[54] ANTENNA APPARATUS FOR VEHICLES

[75] Inventor: Harushige Yamamoto, Tokyo, Japan

[73] Assignee: Niles Parts Co., Ltd., Tokyo, Japan

[21] Appl. No.: 09/082,148

[22] Filed: May 21, 1998

[30]     Foreign Application Priority Data

Jun. 30, 1997  [JP]  Japan .................................... 9-189028

[51] Int. Cl.[7] ................................................. B60R 25/10
[52] U.S. Cl. ......................... 343/713; 343/711; 340/426; 340/539; 307/10.2
[58] Field of Search .................................... 343/713, 711, 343/712, 714; 340/426, 539, 425.5, 573; 440/61; 307/10.2

[56]         References Cited

U.S. PATENT DOCUMENTS 5,396,215  3/1995  Hinkle ...................................... 340/426

5,707,262  1/1998  Huntley et al. ........................... 440/61

*Primary Examiner*—Don Wong
*Assistant Examiner*—James Clinger
*Attorney, Agent, or Firm*—Ronald P. Kananen; Rader, Fishman & Grauer

[57]            ABSTRACT

An antenna apparatus for a keyless entry device is also used for receiving a radio wave transmitted by a remote control unit within a vehicular compartment. The keyless entry device and the remote control unit are configured to generate respective radio waves having a common frequency. Both radio waves can be received by at least one antenna of a column switch and a steering wheel. The antennas are placed distant from the steering shaft and common ground pattern to improve transmitting and receiving sensitivity.

13 Claims, 3 Drawing Sheets

ANTENNA APPARATUS FOR VEHICLES

BACKGROUND OF THE INVENTION

1. Field of the Invention

The present invention relates generally to antennas. More particularly, the present invention relates to antenna apparatuses for vehicles.

2. Description of the Related Art

Certain conventional apparatuses unlock vehicular doors using radio waves. Some keyless entry apparatuses of this type have an exclusive antenna that is set, for example, on the rear window glass and a receiving circuit arranged within the trunk in order to increase the signal receiving sensitivity. The receiving circuit and the antenna are connected through a coaxial cable. One implementation of this type of arrangement is disclosed in unexamined Japanese Utility Model Publication No. H4-86382.

In some implementations, however, a coaxial cable is used to connect the receiving circuit and the antenna. Such implementations also require a connector exclusive for the coaxial cable, a case for accommodating the receiving circuit, and a power source line for supplying radio waves to the receiving circuit. These additional components can significantly increase the cost of the keyless entry system.

SUMMARY OF THE INVENTION

An object of the present invention is to provide an antenna apparatus for a vehicle that solves the problems associated with the conventional apparatus described above.

More specifically, it is an object of the present invention to provide an inexpensive apparatus that does not require a coaxial cable for connecting the transceiver circuit and the antenna, a connector exclusive for the coaxial cable, a case for housing the transceiver circuit, and a power source line exclusive for supplying power to the transceiver circuit. The antenna is also used for receiving radio waves generated by the remote control unit within a vehicular compartment. The resulting overall reduction in the number of components reduces the cost of the vehicle.

According to one embodiment of the present invention, an antenna apparatus for vehicles is characterized in that the frequency of a radio wave generated from a keyless entry apparatus outside a vehicle and the frequency of a radio wave generated from a remote control unit inside a compartment are the same. Both radio waves are received by at least one antenna of a column switch and a handle.

In another embodiment, the antenna apparatus also makes use of a remote control unit for remote controlling a vehicular load at a seat other than the driver's seat.

According to still another embodiment, the antennas are placed at a predetermined distance from the steering shaft of the vehicle.

In yet another embodiment of the present invention, the antennas are placed at a predetermined distance from a common ground.

The above summary of the present invention is not intended to describe each illustrated embodiment or every implementation of the present invention. The figures and the detailed description that follow more particularly exemplify these embodiments.

BRIEF DESCRIPTION OF THE DRAWINGS

These and other aspects and advantages of the present invention will become apparent upon reading the following detailed description and upon reference to the drawings. In the drawings.

BRIEF DESCRIPTION OF THE EMBODIMENT

Figure 1:
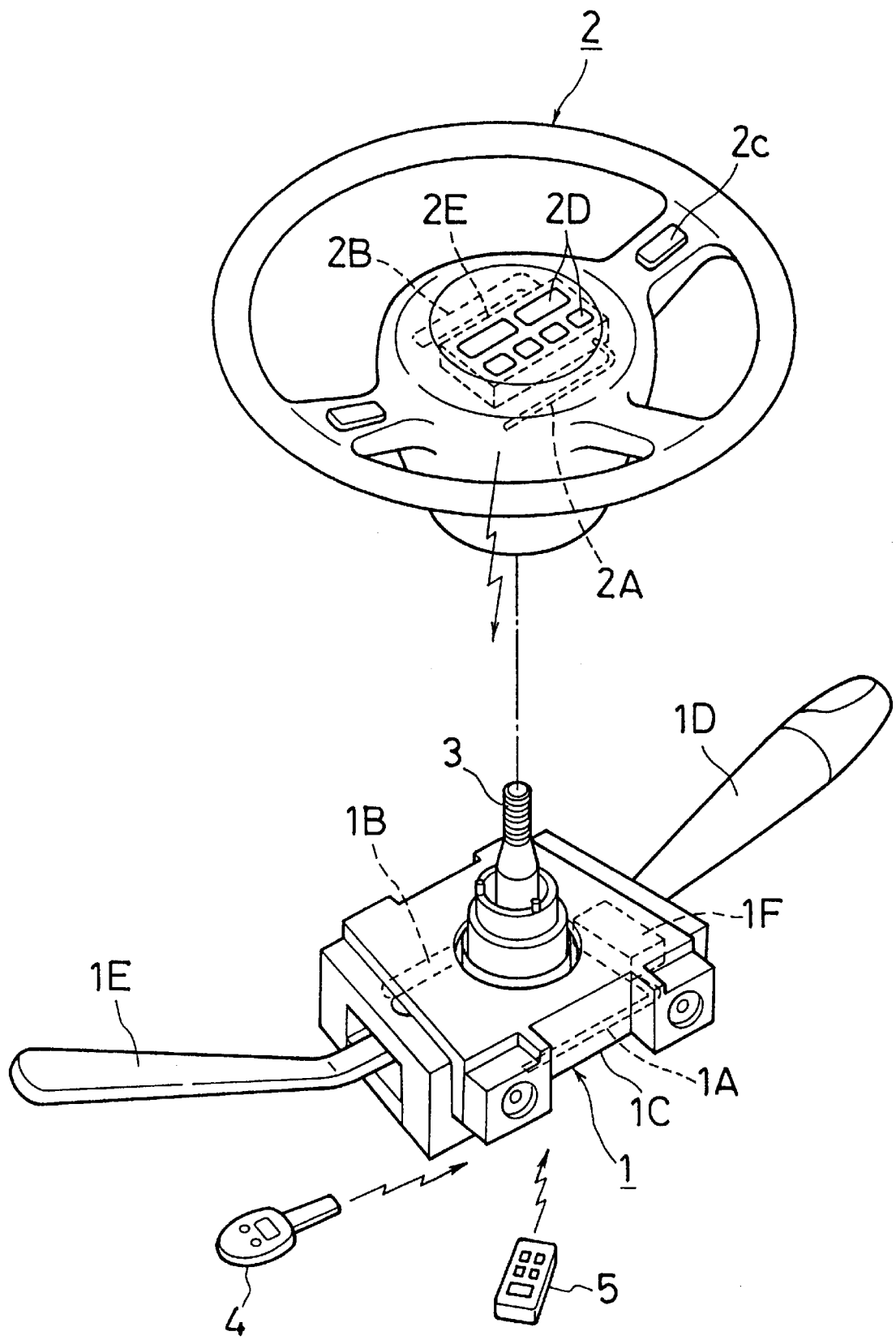
FIG. 1 is an exploded view of an example antenna apparatus according to an embodiment of the present invention.

The invention is amenable to various modifications and alternative forms. Specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE INVENTION

The present invention is believed to be applicable to a variety of systems and arrangements for receiving remote control signals. The invention has been found to be particularly advantageous in environments in which these signals are received in a vehicle. An appreciation of various aspects of the invention can be gained through a discussion of various application examples operating in such environments.

Referring now to the drawings, FIG. 1 illustrates an example antenna apparatus according to an embodiment of the present invention. In the embodiment depicted in FIG. 1, a column switch 1 is attached to a back side of a steering wheel 2. The column switch 1 is attached, for example, to a steering column section (not shown in FIG. 1) positioned on the back side of the steering wheel 2. Operating levers 1D and 1E are disposed at the left and right hand sides of a switch main body 1C.

These levers 1D and 1E are used to operate, for example, a wiper operating system circuit, a light on/off operating system circuit, and a turn signal lamp operating system circuit of the vehicle. Actuating a lever 1D or 1E toggles one or more of a plurality of combination switch sections 1G (see FIG. 2) related, for example, to wiper operation, light on/off operation, and turn signal lamp operation within the switch main body 1C. Also, the switch main body 1C includes a printed circuit board (not shown) mounted with an antenna 1A and a transceiver circuit 1F.

Figure 2:
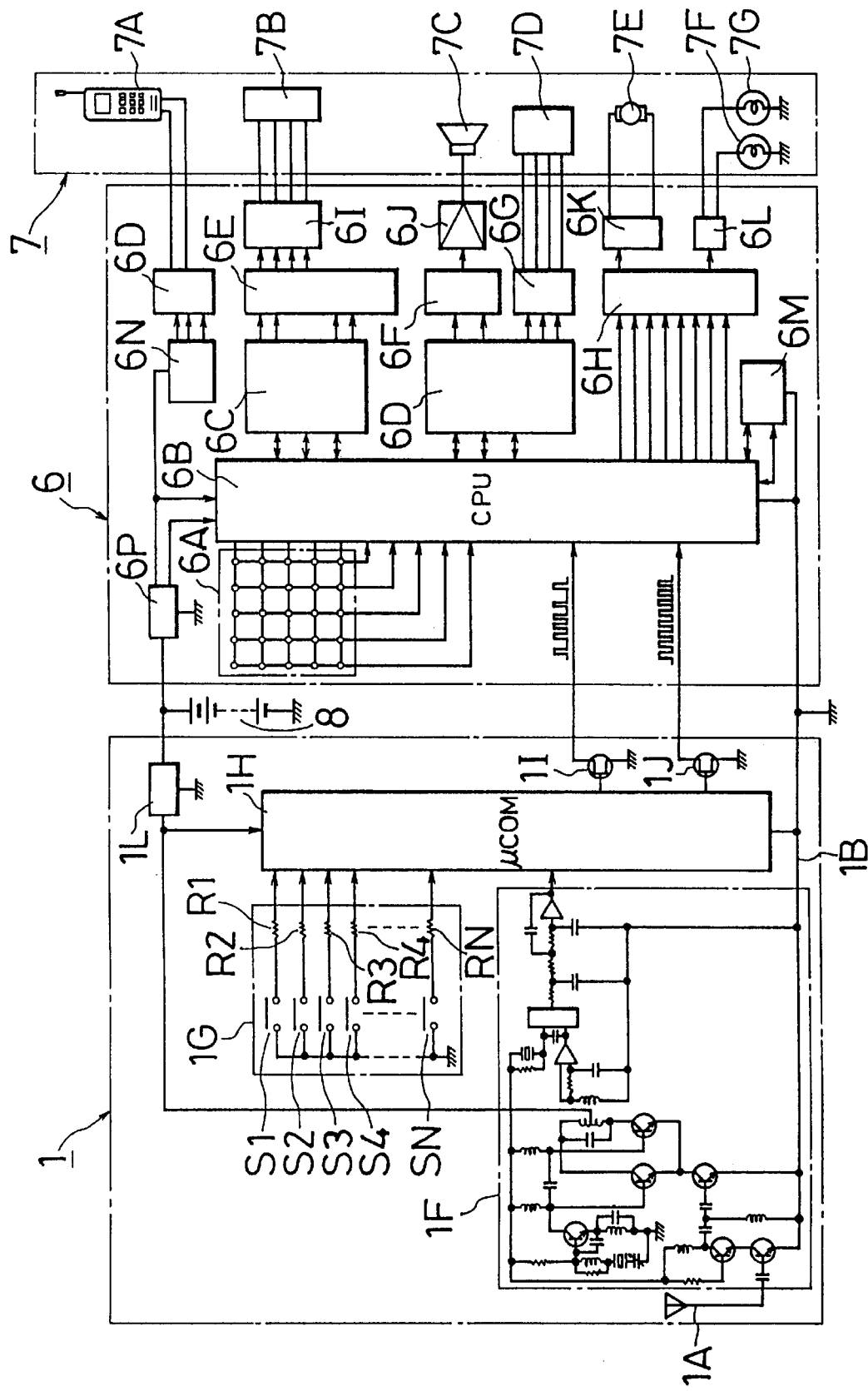
FIG. 2 is a schematic diagram illustrating an example circuit arrangement forming part of the antenna apparatus of FIG. 1, according to another embodiment of the present invention.

FIG. 2 illustrates an example circuit incorporated into the column switch 1, according to a particular embodiment of the present invention. In the embodiment depicted in FIG. 2, the transceiver circuit 1F is configured and arranged to demodulate an encoded signal carried by a radio wave received by an antenna 1A from a transmitter in the steering wheel 2, a keyless entry apparatus 4, or a remote control device 5. The steering wheel 2, the keyless entry apparatus 4, and the remote control device 5 are configured to generate these radio waves at a common frequency. The transceiver circuit 1F has an output end connected to a microcomputer 1H at a rear stage.

As illustrated in FIG. 2, the microcomputer 1H is also connected to the combination switch section 1G. The microcomputer 1H is programmed to output an encoded signal through a first output section 1I in response to input signals from a transceiver circuit 1F and the combination switch section 1G, and, simultaneously with the encoded signal, a synchronizing/clock signal through a second output section 1J. The encoded signal and synchronizing/clock signal are provided as inputs to a control unit 6, which is discussed below.

The transceiver circuit 1F, the combination switch section 1G, the microcomputer 1H, the first output section 1I, and the second output section 1J of the column switch 1 are connected to a common ground pattern 1B. The conductor pattern of the printed circuit board is designed such that the antenna 1A is at least, e.g., 10 mm distant from the common ground pattern 1B, and at least, e.g., 10 mm from a steering shaft 3 (see FIG. 1) positioned through the center of the column switch 1. Separating the antenna 1A from the ground improves the signal receiving sensitivity.

To unlock the door from the outside of the vehicle, the keyless entry apparatus 4 transmits a radio wave. The frequency and electric field strength of the radio wave transmitted by the keyless entry apparatus 4 are determined by the radio wave management method. In a particular embodiment, the frequency is limited to no more than several hundred MHz, and the electric field strength is restricted to several hundred $\mu$V/m at a location several meters distant from a transmission source. Therefore, where the frequency of the radio wave to be received by the antenna is set at several hundred MHz, the length of the antenna 1A may be set at several tens of centimeters. In its attaching position, the column switch 1 is close to the vehicular front glass so that the radio wave transmitted from a radio wave transmitting source can be received by the antenna 1A with high sensitivity without being blocked by the electromagnetically shielded vehicular body.

The transceiver circuit 1F shown in FIG. 2 can be implemented using a conventional FM demodulation type receiving circuit known in the art. Also, in the embodiment illustrated in FIG. 2, the combination switch section 1G is implemented using a combination of switches S1, S2, S3, S4, . . . SN and resistances R1, R2, R3, . . . RN. The column switch 1 depicted in FIG. 2 also includes a voltage regulator 1L.

A control unit 6 is connected to the column switch 1 and is configured to control vehicular loads 7. Examples of such vehicular loads 7 include, but are not limited to, a hands-free section 7A, a display section 7B, a speaker section 7C, an air-conditioning section 7D, a door locking actuator section 7E, and lamp sections 7F and 7G, incorporated, for example, into an audiovisual (AV) device provided in a center console section. The control unit 6 shown in FIG. 2 includes a touch switch 6A; CPUs 6B, 6C, and 6D; a visual driver 6E; an audio driver 6F; an air-conditioner driver 6G; a power drive section 6H; an output section 6I; an amplifier 6J; relays 6K and 6L; a ROM 6M; a controller 6N; a TEL block 6O; and a voltage regulator 6P. The column switch 1 and the control unit 6 are connected to a direct current power source 8 for the vehicle.

Figure 3:
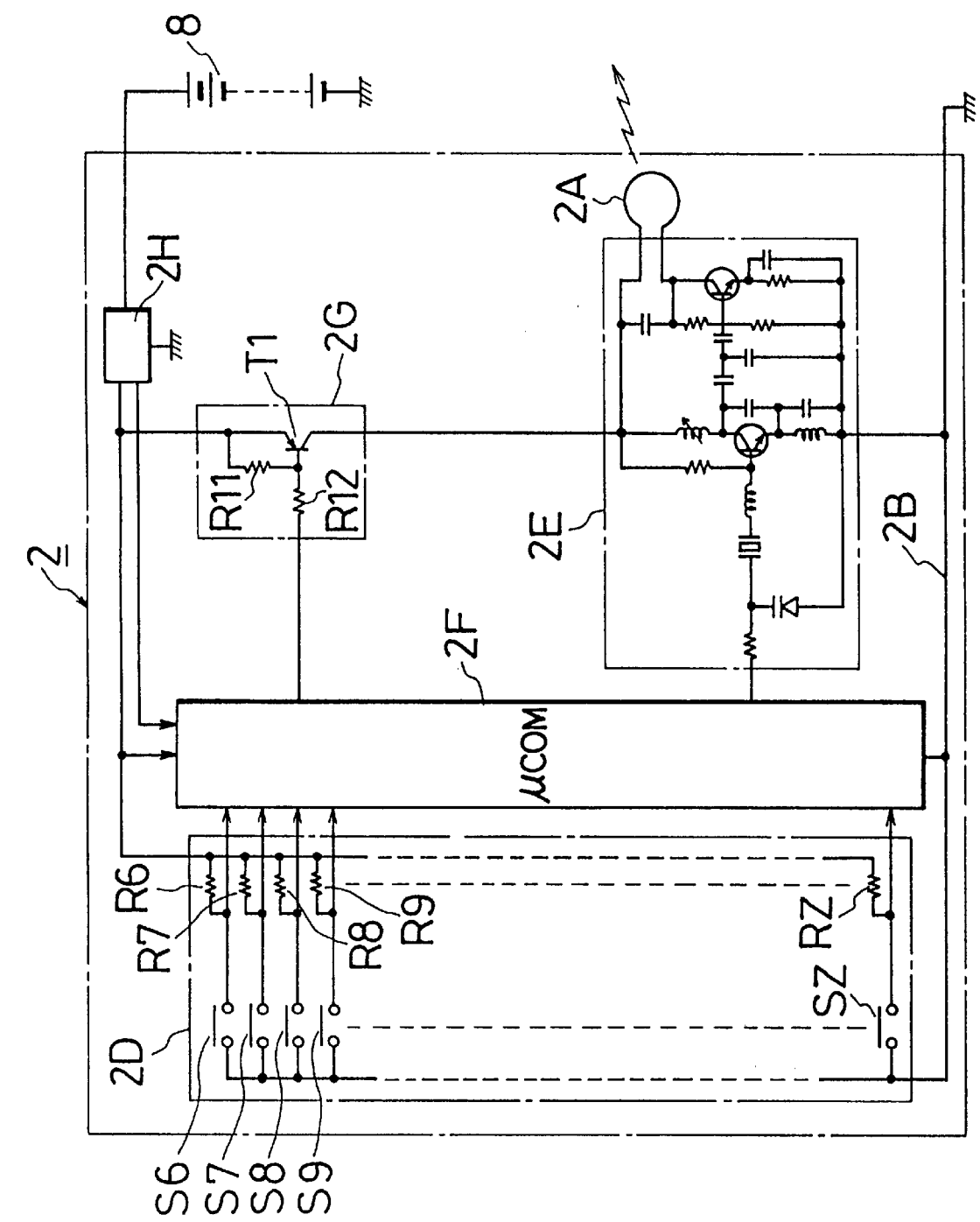
FIG. 3 is a schematic diagram illustrating an example circuit arrangement forming another part of the antenna apparatus of FIG. 1, according to still another embodiment of the present invention.

As illustrated in FIG. 1, the steering wheel 2 includes a remote control switch 2D set in a padded section, e.g., next to a horn switch 2C. FIG. 3 is a schematic diagram illustrating an example circuit arrangement implementing part of the steering wheel 2, according to a particular embodiment of the present invention. This circuit arrangement includes a transceiver circuit 2E for demodulating the encoded signal outputted by the microcomputer 2F for transmission as a radio wave through the antenna 2A. The encoded signal is received through an input at a front end of the transceiver circuit 2E. Demodulation is controlled using the remote control switch 2D. The radio wave transmitted by the antenna 2A is set at the same frequency as the radio wave transmitted by the keyless entry apparatus 4.

A power source of the transceiver circuit 2E is connected to a switch 2G. The switch circuit 2G comprises a transistor T1 and resistance R11 and R12, enabling activation and deactivation of the transceiver circuit 2E by the microcomputer 2F. Those skilled in the art will appreciate that the transceiver circuit 2E can be implemented using a conventional FM modulation type transmitting circuit. The remote control switch 2D comprises a combination of switches S6, S7, S8, S9, . . . SZ and resistances R6, R7, R8, R9, . . . RZ. The circuit arrangement illustrated in FIG. 3 also includes a voltage regulator 2H.

The remote control switch 2D, the transceiver circuit 2E, and the microcomputer 2F of the steering wheel 2 are connected to a common ground pattern 2B. The conductor pattern of the printed circuit board is designed such that the antenna 2A is at least, for example, 10 mm distant from the ground pattern 2B and at least 10 mm distant from the steering shaft placed through the center of the column switch 1. Separating the antenna 2A from the ground 2B improves signal receiving sensitivity.

An understanding of the operation of this embodiment of the present invention can be gained through the following discussion. For example, if a radio wave is transmitted from the keyless entry apparatus 4 outside the vehicle, the radio wave is received by the antenna 1A of the column switch 1 and provided as an input to the transceiver circuit 1F. The transceiver circuit 1F wave-detects a high frequency signal to extract an encoded signal carried by the high frequency signal, inputting it to the microcomputer 1H. The microcomputer 1H compares the inputted encoded signal with a pre-stored reference code. As a result, if an ID code for the own vehicle is detected, the microcomputer determines the kind of control code transmitted in combination with the ID code. Where the control code represents a keyless entry, a corresponding encoded signal is output to the CPU 6B of the control unit 6 and a clock signal. This causes the control unit 6 to output a control signal to a door lock actuator 7E to unlock the door.

If a radio wave is transmitted from the remote control unit 5 within rather than outside the vehicle, the radio wave is received by the antenna 1A of the column switch 1 and provided as an input to the transceiver circuit 1F. The transceiver circuit 1F wave-detects a high frequency signal to extract an encoded signal carried by the high frequency signal, inputting it to the microcomputer 1H. The microcomputer 1H determines the kind of a control code from the inputted encoded signal and a pre-stored reference code to output a corresponding encoded signal to the CPU 6B of the control unit 6 and a clock signal. This causes the control unit 6 to output a control signal to, for example, the air-conditioning section 7D or a similar subsystem.

If, on the other hand, a radio wave is transmitted from the handle 2, the radio wave is received by the antenna 1A of the column switch 1 and provided as input to the transceiver circuit 1F. The transceiver circuit 1F wave-detects a high frequency signal to extract an encoded signal carried by the high frequency signal, inputting it to the microcomputer 1H. The microcomputer 1H determines the kind of a control code from the inputted encoded signal and a pre-stored reference code to output a corresponding encoded signal to the CPU 6B of the control unit 6 and a clock signal. This causes the control unit 6 to output a control signal to a hands-free section 7A, a display section 7B, a speaker 7C, and/or the air-conditioning section 7D or a similar subsystem.

With the radio wave generated from the keyless entry apparatus and the radio wave generated from the remote control unit inside the compartment having the same frequency, both radio waves can be received by at least one antenna of a column switch and a steering wheel. As a result, the radio wave transmitted from the keyless entry apparatus is free of obstruction by the electromagnetically shielded vehicular body and can be received by the antenna with high sensitivity. Furthermore, the antenna apparatus of the present invention is inexpensive and does not require a coaxial cable for connecting the transceiver circuit and the antenna, a connector exclusive to the coaxial cable, a case for housing the transceiver circuit, or a power source line exclusively for supplying power to the transceiver circuit. The antenna can also be used to receive the radio wave generated by the remote control unit within the vehicular compartment, reducing the total price of the vehicle.

Also, because the remote control unit can be used to control a vehicular load at a seat other than the driver's seat, another advantage offered by the present invention is that the radio wave generated at the other seat can be received by the antenna for the keyless entry apparatus. Moreover, placing the antennas distant from the steering shaft and the common ground pattern improves the transmitting and receiving sensitivity of the antenna.

The various embodiments described above are provided by way of illustration only and should not be construed to limit the invention. Those skilled in the art will readily recognize various modifications and changes that can be made to these embodiments without strictly following the example embodiments and applications illustrated and described herein, and without departing from the true spirit and scope of the present invention, which is set forth in the following claims. For example, the antenna provided in the handle can receive the radio wave transmitted by the keyless entry apparatus or the remote control unit. Also, the modulating method by using the transceiver can adopt a method other than the FM modulating method. Further, the column switch can be implemented as a switch around the vehicular handle or steering wheel, and not limited to the lever switch type illustrated in and discussed in connection with FIG. 1.

What is claimed is:

1. An antenna apparatus for use in a vehicle, comprising:
    a first antenna located in a steering wheel of the vehicle or in a column switch adapted to be attached to a steering column of the vehicle;
    a remote transmitter that transmits an encoded radio wave signal having a preselected frequency from a location outside the vehicle;
    an interior transmitter located inside the vehicle that transmits an encoded radio wave signal having the same frequency as the radio wave signal transmitted by the remote transmitter; and
    the first antenna being configured and arranged to receive the encoded radio wave signals transmitted by the remote transmitter outside the vehicle and the interior transmitter inside the vehicle.

2. An antenna apparatus according to claim 1, wherein the interior transmitter comprises a remote controller configured and arranged to control a vehicular load from a passenger seat of the vehicle other than the driver's seat.

3. An antenna apparatus according to claim 2, wherein the vehicular load comprises at least one of a hands-free communication arrangement, a display arrangement, a speaker arrangement, an air-conditioning arrangement, a door lock actuation arrangement, and a lamp arrangement.

4. An antenna apparatus according to claim 1, further comprising a steering shaft coupled to the steering wheel adjacent to the column switch, the first antenna being located at a preselected distance from the steering shaft.

5. An antenna apparatus according to claim 4, wherein the preselected distance is at least 10 mm.

6. An antenna apparatus for use in a vehicle, comprising:
    a first antenna located in a steering wheel of the vehicle; and
    a second antenna located in a column switch;
    wherein the first and second antennas are configured and arranged to receive radio waves of a preselected frequency generated by at least one of a remote transmitter outside the vehicle and an interior transmitter inside the vehicle; and
    further comprising first and second common ground patterns associated with the first and second antennas, respectively, wherein the antennas are located at a preselected distance from the common ground patterns with which they are associated.

7. An antenna apparatus according to claim 6, wherein the preselected distance is at least 10 mm.

8. An antenna apparatus according to claim 1, further comprising a transceiver circuit coupled to receive a control signal from a microcomputer located in the steering wheel and configured and arranged to demodulate the control signal for output using a second antenna, said second antenna being located in the steering wheel and said first antenna being located in the column switch.

9. An antenna apparatus for use in a vehicle, comprising:
    a first antenna located in a steering wheel of the vehicle; and
    a second antenna located in a column switch;
    wherein the first and second antennas are configured and arranged to receive radio waves of a preselected frequency generated by at least one of a remote transmitter outside the vehicle and an interior transmitter inside the vehicle;
    further comprising a transceiver circuit coupled to receive a control signal from a microcomputer and configured and arranged to demodulate the control signal for output using at least one of the first and second antennas; and
    wherein the microcomputer is configured and arranged to receive an input signal from the transceiver circuit and, in response to the input signal, provide the control signal to the transceiver.

10. An antenna apparatus according to claim 1, wherein the remote transmitter is a keyless entry apparatus for locking and unlocking doors of the vehicle.

11. A remote control arrangement for a vehicle, comprising:
    a keyless entry transmitter that transmits an encoded radio wave signal having a preselected frequency from a location outside the vehicle;
    a first interior transmitter located inside the vehicle that transmits an encoded radio wave signal having the same frequency as the radio wave signal transmitted by the keyless entry transmitter; and
    a first antenna located in a steering wheel of the vehicle or in a column switch adapted to be attached to a steering column of the vehicle, said first antenna being configured and arranged to receive the encoded radio wave signals transmitted by the remote transmitter outside the vehicle and the first interior transmitter inside the vehicle and to communicate the signals to a transceiver circuit for controlling a vehicular load.

12. The remote control arrangement according to claim 11, wherein the first interior transmitter comprises a remote controller configured and arranged to control a vehicular load from a passenger seat of the vehicle other than a driver's seat.

13. The remote control arrangement according to claim 12, wherein said first antenna is located in said column switch, and further comprising a second interior transmitter located inside the vehicle that transmits an encoded radio wave signal having the same frequency as the radio wave signal transmitted by the keyless entry transmitter and the first interior transmitter, said second interior transmitter comprising a second antenna and a transceiver circuit located in the steering wheel.

* * * * *